Aug. 4, 1936.  W. W. BAGLEY  2,049,682
TURPENTINE CUP
Filed Sept. 16, 1935
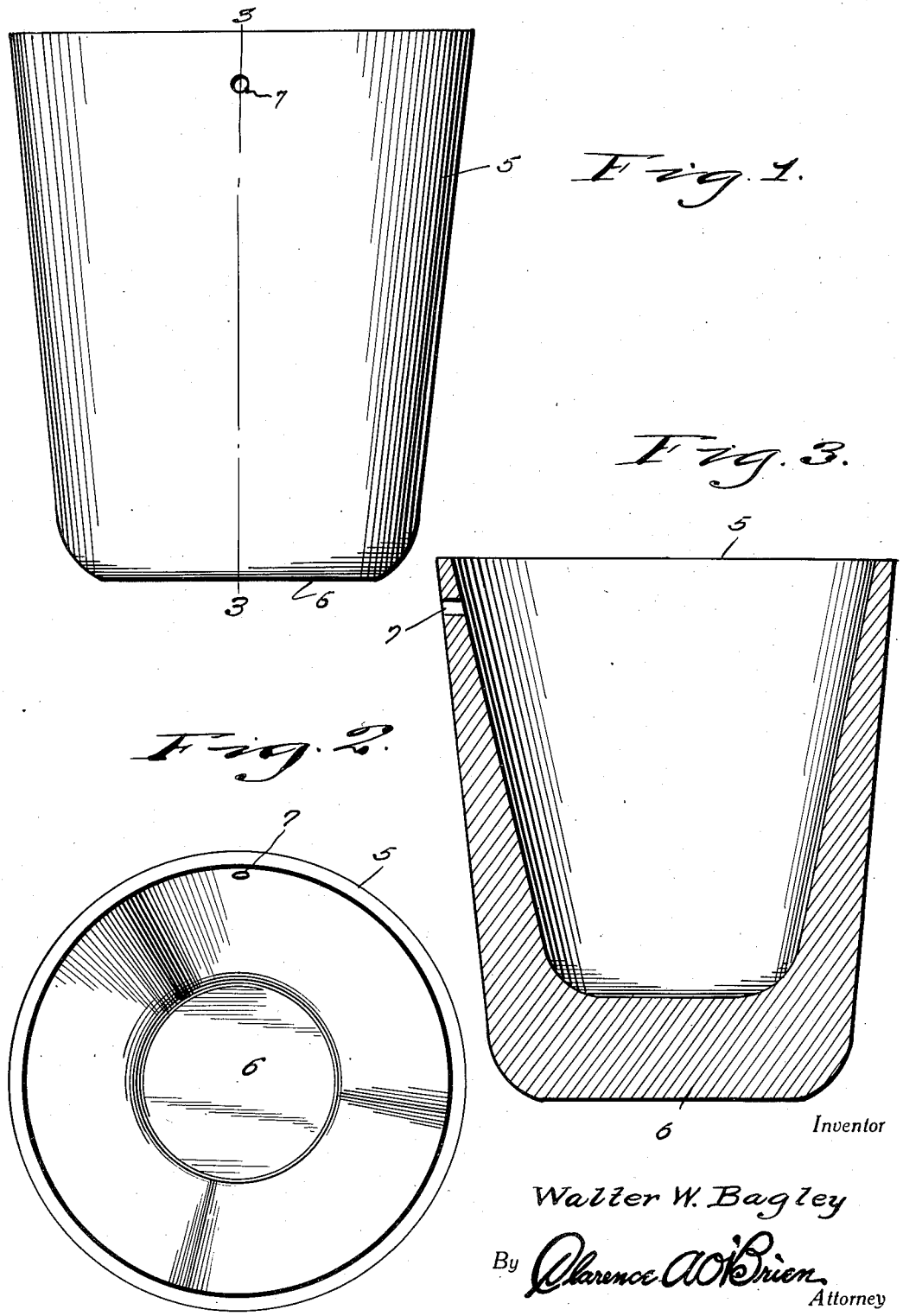
Inventor
Walter W. Bagley
By Clarence A. O'Brien
Attorney Patented Aug. 4, 1936

2,049,682

UNITED STATES PATENT OFFICE 2,049,682

TURPENTINE CUP

Walter W. Bagley, Nicholls, Ga.

Application September 16, 1935, Serial No. 40,858

1 Claim. (Cl. 47—11)

This invention appertains to new and useful improvements in receptacles such as are employed in the industry of turpentine gaining.

The principal object of the present invention is to provide a receptacle for catching the crude gum from pine trees which is later converted into turpentine, through the agency of a receptacle which will be heat resisting, immune from freezing temperatures and will not crack or break, nor discolor the gum, which disadvantages frequently occur in the use of metallic cups.

Other important objects and advantages of the invention will become apparent to the reader of the following specification.

In the drawing:

Figure 1 represents a side elevational view of the cup.

Figure 2 represents a top plan view of the cup.

Figure 3 represents a vertical sectional view taken substantially on line 3—3 of Figure 1.

Referring to the drawing wherein like numerals designate like parts, it can be seen that the cup is denoted by numeral 5 and is constructed of black gum wood, which wood frequently grows in the regions of turpentine producing trees.

This cup or receptacle is preferably of downwardly tapering formation and has an interior of even a sharper downward taper than the outside, thus resulting in walls which gradually thicken downwardly to a relatively thick base or bottom 6. A suitable opening 7 is provided in the wall of the receptacle adjacent the top thereof through which the hanger for the cup can extend.

While the foregoing specification sets forth the invention in specific terms, it is to be understood that numerous changes in the shape, size and materials may be resorted to without departing from the spirit and scope of the invention as claimed hereinafter.

Having described the invention, what I claim as new is:

A turpentine collecting receptacle constructed of black gum wood and provided with a thick bottom and upwardly tapering side walls and a relatively thick bottom wall.

WALTER W. BAGLEY.